3,168,207
BLOW MOLDING
Robert L. Noland and Walter O. Weber, Wilmington, Del., assignors to Haveg Industries, Inc., Wilmington, Del., a corporation of Delaware
Filed Sept. 25, 1963, Ser. No. 311,412
10 Claims. (Cl. 215—1)

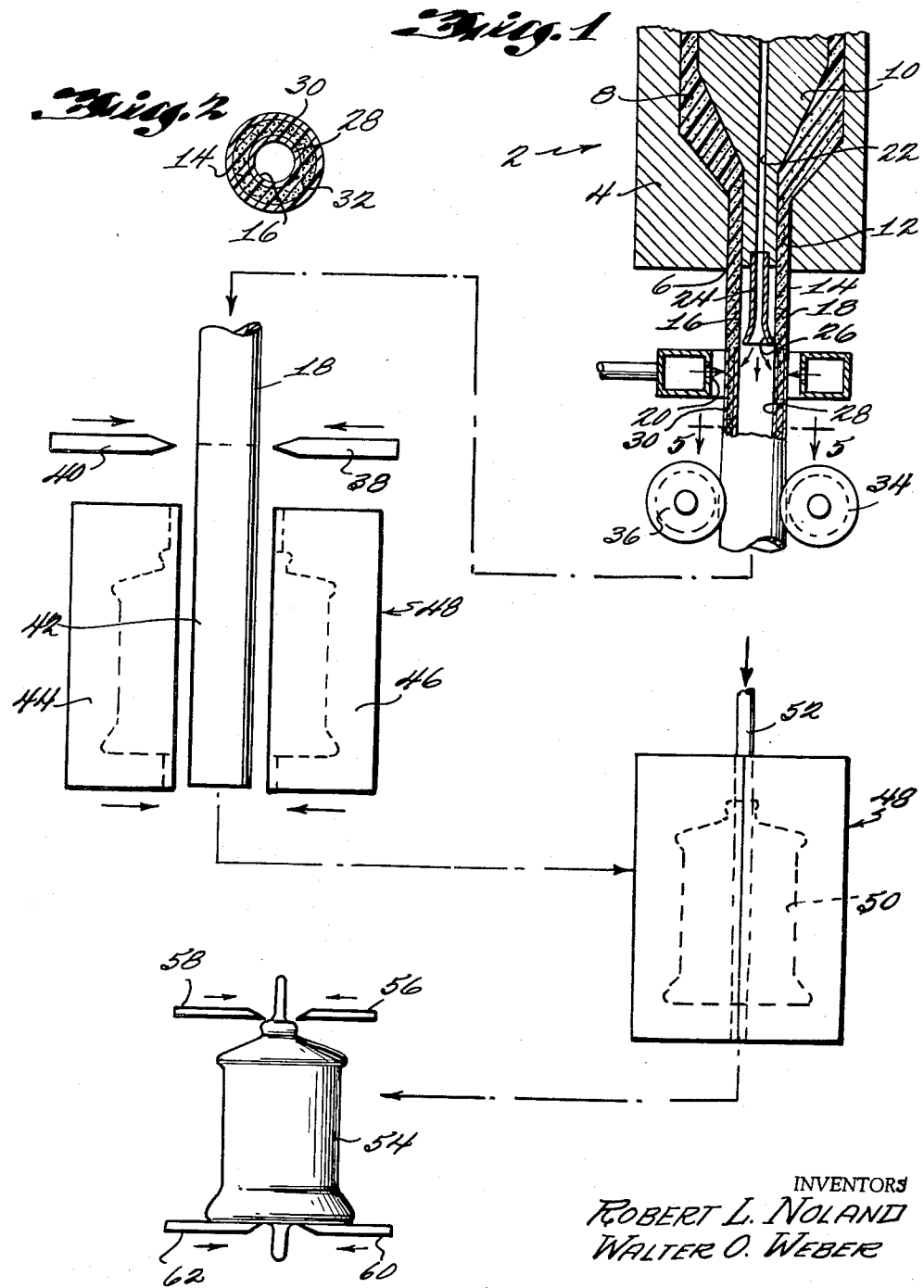

This application is a continuation-in-part of application Serial No. 274,650, filed April 22, 1963.

The present invention relates to the blow molding of foamed plastics.

It is well known to blow mold plastic articles, Jones et al. "Blow Molding" (published by Reinhold Publishing Corp. 1961).

In a typical example of blow molding of hollow plastic articles, the plastic in heated semi-fluid condition is supplied to an extrusion nozzle so that it issues from the nozzle in a tubular form. A tubular parison of a length necessary to form the desired article is formed at the extrusion nozzle, and a plurality of mold sections are moved radially inwardly of the parison to a position in which they engage and form a mold having a cavity which surrounds the parison. One end of the parison is closed and a suitable gas, such as air, is blown into the interior of the parison so as to expand it into conformity with the mold cavity.

It has been proposed to adapt the blow molding technique to foamed polystyrene, Goldsberry et al., Society of Plastics Engineering Journal, April 1962, pages 448–454. However, there is a problem in obtaining uniform products.

When one tries to extrude a polystyrene foam and put it in the blow molding machine, there is an uncontrolled expansion. It is impossible to control the thickness of the walls. This is compounded by the fact that when the parison is blown, the weakest places in the foamed wall are blown the most. If the foamed polystyrene is cooled, then it also will not blow mold satisfactorily.

It is an object of the present invention to prepare improved blow molded objects from foamed plastics.

Another object is to develop an improved method for blow molding foamed plastics.

A further object is to form biaxially oriented, blow molded foamed plastic articles.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by blow molding a tube of foamed plastic which has a substantially unfoamed, continuous integral inner and outer skin. The foamed core of the tube normally comprises 70 to 95% of the total thickness with the balance being divided between the two skins. Usually, although not necessarily, the skins are of substantially equal thickness.

The skins supply extra strength to the foamed tube so that it can withstand the stretching during the blow molding step.

The blowing stretches the tube laterally. Preferably the tube is also stretched lengthwise, e.g. by pulling the tube lengthwise as it is formed. The biaxial orientation gives further strength to the article.

The biaxial stretching can be to an extent of 25 to 400% in each direction. Preferably it is 50 to 200% each way. As indicated, however, the longitudinal stretching can be omitted.

Any of the blow molding procedures disclosed in Jones et al. can be employed.

The present invention is useful in forming blow molded articles from foamed polystyrene, foamed polyethylene of high density, e.g. 0.960, medium density, e.g. 0.935, or low density, e.g. 0.914, foamed polypropylene, foamed copolymer of ethylene and propylene, e.g. a 50:50 molar copolymer, foamed vinyl chloride polymer, e.g. polyvinyl chloride or vinyl chloride-vinyl acetate (87:13) copolymer or foamed polyurethanes. Examples of foamed polyurethanes are foams made by foaming prepolymers of polypropylene glycol 2025 molecular weight toluene 2,4-diisocyanate, trimethylol-propane-propylene oxide adduct molecular weight 418-toluene 2,4-diisocyanate, 1,4-butanediol-adipic acid polyester-toluene 2,4-diisocyanate, glycerine-propylene oxide adduct molecular weight 1000-toluene 2,4,6-triisocyanate. In fact, any of the conventional polyols and organic polyisocyanates can be used to form the prepolymer to form the foamed polyurethanes. Thus, there can be used any of the polyols, polyisocyanates or prepolymers disclosed in Knox 3,079,-641, or Friedman 3,081,331 in making the polyurethanes. The entire disclosure of the Knox and Friedman patents is herein incorporated by reference.

When employing polystyrene, there can be used normal crystal grade polystyrene or high impact polystyrene or a mixture containing 5 to 95% normal crystal grade polystyrene and the balance high impact polystyrene. When employing a thermoplastic styrene polymer, it normally contains greater than 50% by weight of styrene and preferably at least 70% by weight of styrene in its structure, e.g. a copolymer of 70% styrene and 30% acrylonitrile. High impact polystyrenes are frequently prepared by polymerizing monomeric styrene in the presence of 2½ to 10% by weight of a rubbery diene polymer or by polymerizing styrene in the presence of such amounts of a difunctional material. Examples of high impact styrene polymers include a terpolymer of 5% acrylonitrile, 5% butadiene and 90% styrene; a copolymer of 5% butadiene and 95% styrene; the product made by polymerizing 95% of styrene in the presence of 5% polybutadiene; a copolymer of 5% chlorosulfonated polyethylene and 95% styrene; a blend of 97.5% polystyrene and 2.5% polybutadiene; a blend of 95% polystyrene and 5% of hydrogenated polybutadiene containing 35.4% residual unsaturation, polystyrene formed in the presence of 5% hydrogenated polybutadiene containing 4.5% of residual unsaturation; a blend of 95% polystyrene and 5% polyisoprene; and a copolymer of 99.5% styrene and 0.5% divinyl benzene.

There can also be used polymerized methyl methacrylate, polychlorotrifluoroethylene, etc.

The invention will be best understood in connection with the drawings wherein:

FIGURE 1 is an illustration partially in section, of the overall process with the steps of the process going in the direction of the arrows on the dot-dash lines; and FIGURE 2 is a sectional view of the foamed tube.

Referring more specifically to the drawings, there is provided an extruder indicated generally at 2 having a die section 4 and a circular die opening 6.

*Example 1*

There is provided a polystyrene composition by mixing 50 parts of pellets of high impact polystyrene (Foster Grant's Tuflex 216, polystyrene modified with 5% polybutadiene) and 50 parts of pellets of regular crystal polystyrene (Koppers Dylene 8). This composition is designated hereinafter as Composition A.

90 parts of Composition A were tumbled for 5 to 10 minutes with 10 parts of Dow-Pelespan 101 (expansible polystyrene beads containing 6% pentane) and 0.5 part of Bayol 35 (a petroleum aliphatic hydrocarbon white oil). The tumbling was carried out at room temperature. There were then added as a nucleating agent 0.3 part of powdered anhydrous citric acid and 0.4 part of powdered sodium bicarbonate and the mixture tumbled for an additional 15 to 20 minutes. The resulting mixture was then added to the extruder 2 passed through the barrel (not shown) where it was softened and kneaded with the aid of a screw at a temperature of 325–350° F. The pressure at the discharge end of the barrel was 2500 p.s.i. The thus-produced plastic composition 8 then entered the die section 4 of the extruder. The extruder also has a central die section 10 and the tube is formed in the die cavity 12 between die section 4 and central die section 10.

It is important to chill the outer surface 14 and the inner surface 16 of the cylindrical tube 18 as it emerges, or shortly thereafter, from the opening 6 of the die. If the surfaces are not cooled rapidly, corrugations are produced in the tube. The chilling resists the lateral expansion of the foam but does not prevent expansion thicknesswise.

The external cooling is provided by directing a blast of air at room temperature, 70° F., from ring nozzle 20 at a velocity of 80 feet/sec. at the outer surface 14 of the tube. The ring nozzle completely circumscribes the tube. Internal cooling is provided by passing a blast of air through an opening 22 in central die section 10 into interior nozzle 24. The interior nozzle 24 is flared outwardly at its open end 26 to distribute the air all around the inner surface 16 of the tube. The velocity of the air emerging from the interior nozzle is 50 feet/sec.

The tube, as it emerges from the die opening 6, has a temperature of about 300° F. The rapid chilling forms a skin 28 on the inner surface 16 and a skin 30 on the outer surface 14 of the tube. While the inner and outer surfaces are thus cooled, there is substantially no cooling of the foamed core 32. The skins have a substantially higher density than the core and, in fact, approximate the density of the polymer itself.

In the illustrative example, the opening 6 in the die had a diameter of 3 inches and the clearance between dies 4 and 10 at the open end was 45 mils. The density of the polystyrene composition employed was 60 lbs./cu. ft. before expansion and was 27 lbs./cu. ft. fully expanded as it came out of the extruder and was 30 lbs./cu. ft. after the chilling operation.

In order to obtain lateral stretching, the tube 18 is pulled lengthwise, e.g. with the aid of gravity, or by feed clamping means such as rolls 34 and 36. The rolls 34 and 36 are driven at a speed sufficient to stretch the tube 50% lengthwise. (In place of a single set of rolls, there can be employed two sets of rolls, the first rotating at a speed sufficient to pull the tube away from the die without significant stretching and the second set of rolls rotating at 1.5 times the speed of the first set.)

The tube 18 can be cut by knives 38 and 40 to form a tubular parison 42 having a diameter of 4 inches which is positioned between the sections 44 and 46 of blow mold 48. The mold sections 44 and 46 are engageable to form the mold 48 so that it has a cavity 50 of a shape corresponding to the shape of the article to be formed. Alternatively instead of precutting the parison, the tube can be positioned in the blow mold 48 without cutting.

A continuous extruder is employed containing a surge chamber. Material is prevented from going out of the extruder die during the blow molding portion of the cycle.

The blow mold 48 has a temperature of 90° F., although this is not critical, e.g. it can be 50° F. or 70° F. The tubular parison as indicated is still hot. Normally, there is a problem in making polystyrene retain its heat for blow molding but this problem is overcome by the presence of the inner and outer skins in the present invention.

The foam polystyrene tube as indicated had a thickness of 45 mils as it issued from the extruder. The thickness increased to 110 mils as a result of the foaming.

After closing the mold 48, high velocity air is introduced through nozzle 52 in the parison 42 to expand it to fill the die cavity 50. The air is introduced at a blowing pressure of 30 p.s.i. (Preferably blowing pressures of not over 50 p.s.i. are employed and pressures of 20–30 p.s.i. are particularly preferred.) In blowing a bottle 54, a convenient blowing cycle is 60 seconds. In the blowing of the parison to form the bottle, there was a lateral stretching of 50%. The final foamed bottle walls had a thickness of 50 mil. (The biaxial stretching resulted in the reduction of thickness from the 110 mil maximum.)

Prior to the stretching, the exterior skin 30 and interior skin 28 each were 5 mils thick and the foam core was 100 mils thick.

After formation of the bottle 54, any flashing can be cut by means of knives 56, 58, 60 and 62.

While the specific example described in connection with the drawings employed a material extruded from a mixture of 90 parts Composition A, 10 parts of expansible polystyrene together with minor amounts of a wetting agent and a nucleating agent. A more economical and superior material suitable for blowing is a mixture of 100 parts of Composition A, 1 part of Celite (diatomaceous earth) having absorbed therein 1 part of pentane (i.e. 2 parts total of Celite-pentane) 0.5 part Bayol 35 and a nucleating agent comprising 0.3 part anhydrous citric acid and 0.4 part of powdered sodium bicarbonate.

As indicated previously, foamed polyethylene, polypropylene, polyvinyl chloride, polyurethanes and the like can also be blow molded. The foamed tube having integral inner and outer continuous substantially unfoamed skins is preferably formed from a dry mixture of finely divided polymer and an absorbent having thereon a volatile liquid as described in Erdman application 262,917, filed March 5, 1963. The foam is preferably prepared with the aid of a nucleating agent as shown in Erdman. The texture of the foam, e.g. the size of the bubbles, can be controlled by the amount of nucleating agent. In general, the more nucleating agent employed, the smaller is the bubble size. Of course, the die employed must be one which extrudes a tube rather than a sheet.

In forming the skin, the air can be replaced by other fluid coolants, e.g. water, a mixture of air and water, nitrogen, argon, helium, etc. can be employed. The critical feature is that the polymer surface be cooled rapidly below its yield point so that no bubbles form on the surfaces of the tube while the core of the tube retains sufficient heat to foam well. The air temperature and velocity are controlled so as to cool just a skin, i.e. about 3 to 15% thickness at the outside of the tube and about 3 to 15% thickness at the inside of the tube. Thus, 70 to 94% of the tube thickness is foamed core.

As the blowing fluid, there can be used water, air, nitrogen, argon, etc.

While in the specific example, rolls 34 and 36 were employed for longitudinal stretching, these can be omitted. In such case, a product is obtained which is only stretched laterally.

When employing polystyrene, the temperature of extrusion will be about 250–320° F. Similar temperatures can be employed with the other polymers although the optimum temperature will vary to some extent with the softening point of the individual polymers. Thus, lower extrusion temperatures are employed with low density polyethylene while higher temperatures are used with high density polyethylene or with polypropylene.

The invention is useful in blow molding articles intended for use where thermal insulation is important.

The articles can have a thickness up to 300 mils. In such case, the mixture emerging from the extruder die has a thickness of 300 mils. It is foamed up to a thickness of up to 750 mils with unfoamed inner and outer skins of 5 to 30 mils each prior to the blow molding operation.

In addition to bottles, other hollow containers can be blow molded by the present procedure. Thus, there can be blow molded jugs, cups, pails, ice cream containers and the like. The containers can be nestable.

In the specific example described in connection with the drawings, the blow molded bottle produced had a diameter of 6 inches and a height of 9 inches.

In another example using polystyrene in which the rollers 34 and 36 were omitted, a 6 x 9" jug was blow molded. The tube as it emerged from the die had a thickness of 25 mils, it was expanded to 100 mils in the foaming operation and then reduced to 55 mils in the blow molding step. The blow-up ratio was about 1.5:1.

In another example, a 55 gallon drum was blow molded. The tube as it came out of the extruder die had a diameter of 14 inches. After foaming, skin formation and blow molding, the foamed drum had a diameter of 22.5 inches and a wall thickness of 100 mils.

The invention can also be employed to directly blow mold a foamed polystyrene, polyethylene, polypropylene or other drum liner for a steel or fiber drum. Such a foam has the advantage of increased stiffness with concomitant resistance to vibration, dimensional stability and provides a snug fit. By using larger wall thickness of foam, e.g., 250 mils, more thermal insulation and shock resistance is imparted.

The foam prepared is normally a high density foam, e.g., a foam having a density of 12 to 45 lbs./cu. ft., preferably 18 to 35 lbs./cu. ft.

While it is generally preferred to carry out the invention by forming both inner and outer skins, it is also possible to form blow molded containers according to the invention having only a single skin. Normally, if a single skin is employed, it will be an inner skin. The use of an inner skin insures against the contents of the bottle, drum or other container going into the pores of the foam. A single inner skin is formed, for example, by utilizing the apparatus of FIGURE 1 but eliminating the external ring nozzle 20 which provides a blast of cooling air. Thus, in a second specific example the procedure of Example 1 was carried out but omitting the use of the external ring nozzle 20. Since no cooling air was provided, there was formed no external unfoamed skin but only the internal skin.

It is also possible to form an external unfoamed skin without having an internal unfoamed skin by retaining the external ring nozzle 20 with its blast of cooling air while not utilizing any blast of cooling air through the interior nozzle 24.

When a single skin is present, the foam resin can be between 50 and 97% of the total thickness of the foam resin and skin.

What is claimed is:

1. A blow molded container of a thermoplastic resin foam, said container consisting of (1) a foam resin core, (2) a non-porous tough outer skin of said resin, and (3) a non-porous tough inner skin of said resin, said core comprising over 50% and not over 95% of the total thickness of the skins and core and having a density of at least 12 lbs./cu. ft. and said core being composed and integral with said skins, said thermoplastic resin being oriented and strecthed at least 25% in at least one direction.

2. A container according to claim 1 wherein the resin is selected from the group consisting of styrene polymers, polyethylene, polypropylene, ethylene-propylene copolymer, polychlorotrifluoroethylene, polymethyl methacrylate, vinyl chloride polymers, and polyurethanes.

3. A container according to claim 1 wherein the resin is a styrene polymer.

4. A container according to claim 1 wherein the thermoplastic resin is biaxially oriented, the stretching being at least 25% in both directions.

5. A blow molded container of a thermoplastic resin foam, said container consisting of a foam resin portion and on at least one of the two exposed surfaces of the foam portion a non-porous, tough skin of said resin, said foam resin comprising over 50% and not over 95% of the total thickness of the foam resin portion and being integral with said skin, said foam portion having a density of at least 12 lbs./cu. ft. and said thermoplastic resin being oriented and stretched at least 25% in at least one direction.

6. A blow molded container according to claim 5, wherein said resin is polyethylene.

7. A blow molded container according to claim 5, wherein said resin is polypropylene.

8. A blow molded container according to claim 5, wherein the foam has a density of 12 to 45 lbs./cu. ft.

9. A blow molded container according to claim 8, wherein the resin is a styrene polymer.

10. A blow molded container according to claim 5, wherein said resin is ethylene-propylene copolymer.

References Cited by the Examiner
UNITED STATES PATENTS

| | | | |
|---|---|---|---|
| 2,532,242 | 11/50 | Ott. | |
| 2,538,684 | 1/51 | Gushard et al. | 215—1.5 |
| 2,917,217 | 12/59 | Sisson | 215—3.5 |
| 2,954,589 | 10/60 | Brown | 215—1.5 |
| 3,043,461 | 7/62 | Glassco | 215—1.5 |
| 3,084,395 | 4/63 | Thielfoldt | 18—553 |
| 3,086,249 | 4/63 | Nelson | 18—553 |
| 3,100,592 | 8/63 | Orr | 229—3.5 |

FRANKLIN T. GARRETT, *Primary Examiner.*

GEORGE O. RALSTON, *Examiner.*